July 19, 1960 R. G. PUCKETT 2,945,512
BARBED WIRE LAYING DEVICE
Filed April 16, 1958 3 Sheets-Sheet 1

INVENTOR.
RONALD G. PUCKETT
BY
George J. Rubens
ATTORNEYS.

July 19, 1960 R. G. PUCKETT 2,945,512
BARBED WIRE LAYING DEVICE
Filed April 16, 1958 3 Sheets-Sheet 2

INVENTOR.
RONALD G. PUCKETT
BY

July 19, 1960 R. G. PUCKETT 2,945,512
BARBED WIRE LAYING DEVICE
Filed April 16, 1958 3 Sheets-Sheet 3

INVENTOR.
RONALD G. PUCKETT

United States Patent Office 2,945,512
Patented July 19, 1960

2,945,512
BARBED WIRE LAYING DEVICE
Ronald G. Puckett, Olathe, Kans.
(8904 100th SE., Renton, Wash.)
Filed Apr. 16, 1958, Ser. No. 729,038
7 Claims. (Cl. 140—2)
(Granted under Title 35, U.S. Code (1952), sec. 266)

The invention described herein may be manufactured and used by or for the Government of the United States of America for governmental purposes without the payment of any royalties thereon or therefor.

This invention relates to obstacle fabricating equipment, and more particularly to a cart for laying a basket-like barbed wire obstacle along the ground.

The laying of barked wire obstacles, such as a standard barbed wire concertina, is an established military ground operation. It is obvious that the fabricating and laying of such an obstacle in the field by manual methods is a slow, time-consuming task, barbed wire being inherently difficult to handle, especially under battle conditions. To preform an obstacle of this kind and carry it to the site would present a serious problem of transportation because of the volume involved.

The present invention provides a cart for fabricating and laying down a barbed wire concertina automatically as the cart travels along the ground. The cart comprises a carriage, self-propelled or towed by a suitable vehicle, which carries a supply of barbed wire reels and various mechanisms for paying out the barbed wire and forming the desired obstacle pattern. In a preferred embodiment, plurality of spaced, horizontal barbed wire strands or belts are payed through a corresponding number of fixed tubes, to form a hollow pattern, while an encircling barbed wire belt is payed out by a rotating arm. Means are provided to secure said horizontal and circular belts at their crossing point.

Accordingly, a principal object of this invention is to provide a cart for automatically laying a barbed wire barrier without the need for hand fabrication.

A further object is to provide such an apparatus capable of carrying supply spools of barbed wire from which the barrier is fabricated as the cart travels over the ground.

Another object is to provide such a cart which will lay a basket weave barbed wire secured at intermittent points, the fabricating and securing operations being effected by the movement of the cart along the ground.

Other objects and many of the attendant advantages of this invention will be readily appreciated as the same becomes better understood by reference to the following detailed description when considered in connection with the accompanying drawings wherein.

Figure 2:
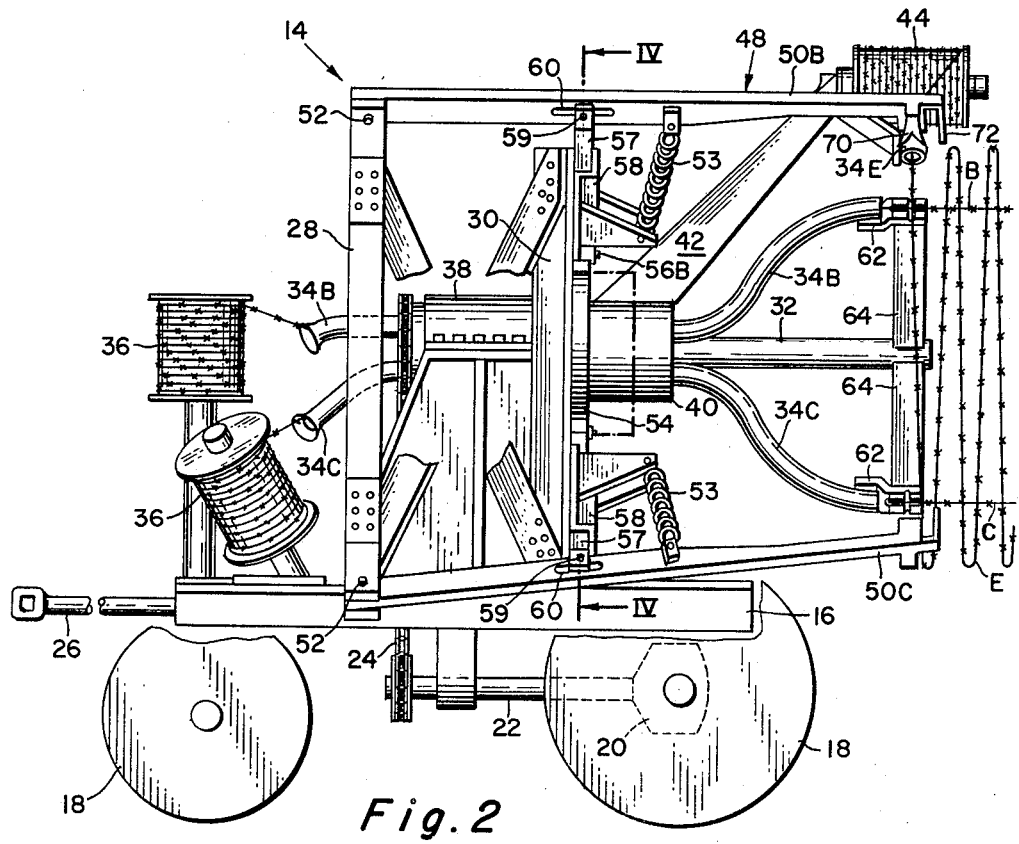
Fig. 2 is a side elevation view of the novel cart.
Figure 1:
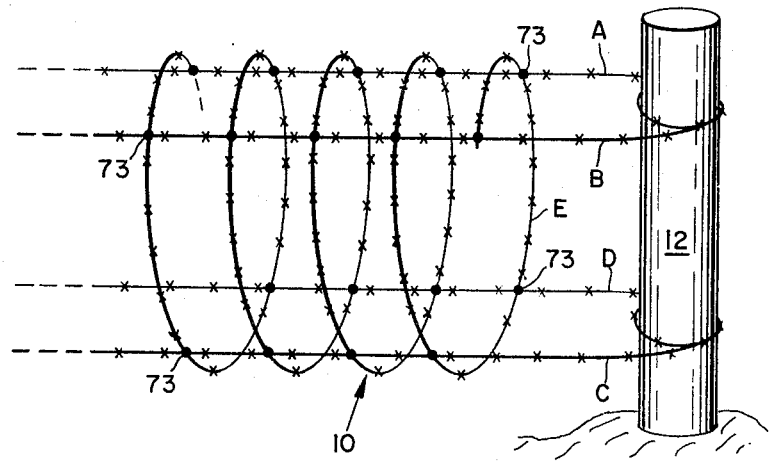
Fig. 1 is a perspective view of a basket weave barbed wire obstacle capable of being laid with the cart of this invention, one end of the obstacle being anchored to a post.
Figure 3:
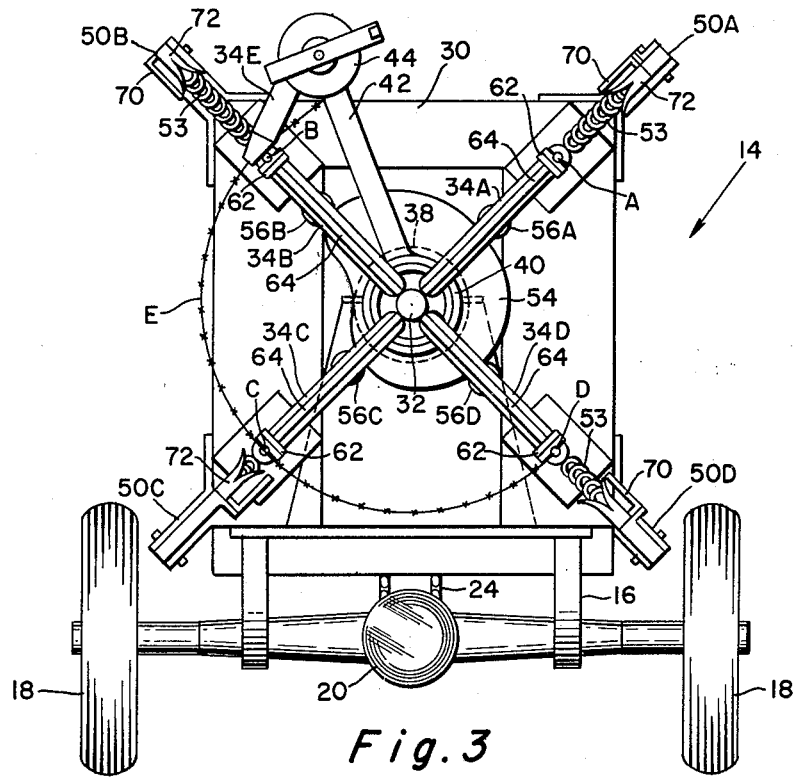
Fig. 3 is a rear elevation view of the cart of Fig. 2.
Figure 4:
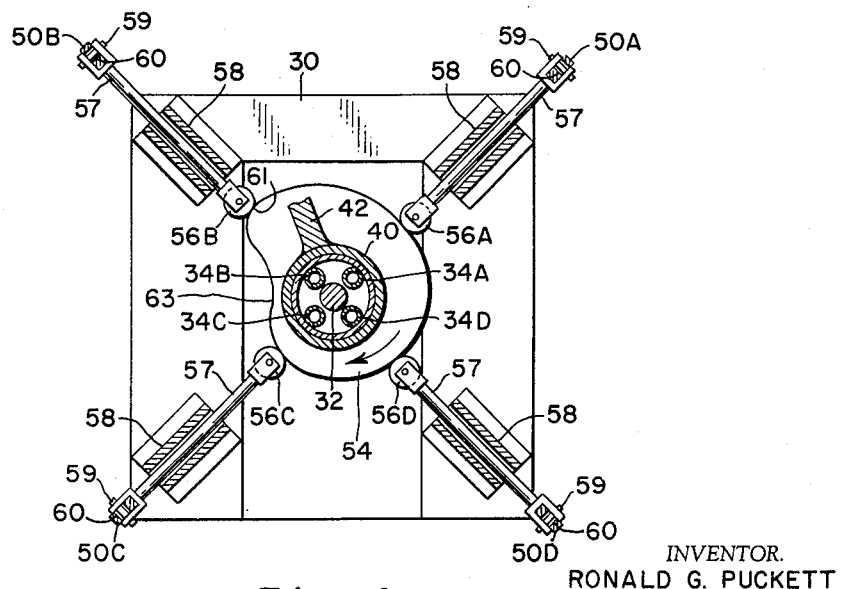
Fig. 4 is a partial transverse section taken along line IV—IV of Fig. 2.
Figure 5:
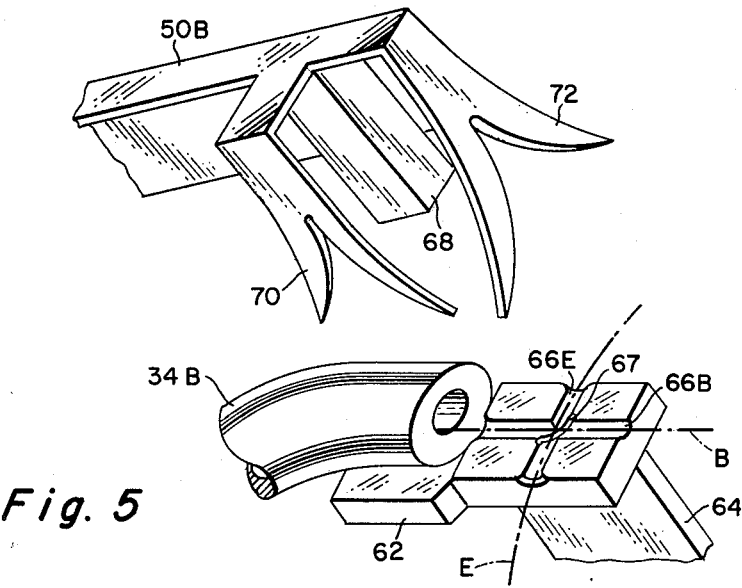
Fig. 5 is an enlarged view of the stapling arm and anvil for guiding and securing together the crossing wires of the obstacle.

Referring to the drawings where like reference numerals refer to similar views throughout the drawings there is shown in Fig. 1 a barbed wire obstacle or concertina 10 having a basket weave configuration anchored at one end to a support, such as a post or tree 12. Obstacle 10 comprises a plurality of spaced horizontally extending wires A, B, C, and D about which a wire E is spirally wound. The wires are of a conventional barbed-wire construction being sufficiently stiff to form a free standing pattern, as shown in Fig. 1. Obstacle 10 is laid by a novel cart 14 as shown in Figs. 2–5.

Obstacle fabricating cart 14 comprises a chassis having a frame 16 supported by a set of four wheels 18. A differential 20 in the rear axle is connected to a drive shaft 22 for turning through suitable gearing (not shown) a sprocket chain 24 driving the fabricating mechanisms on the cart while being propelled over the ground. The cart may be towed by a tank, jeep, or the like through a tow bar 26, or the chassis may be self-powered.

A pair of spaced vertical stands 28 and 30 are mounted and braced to the chassis and rigidly support a horizontal bar 32 about which are fixedly disposed a set of four barbed wire guide tubes 34A to 34D, equally spaced about the longitudinal axis of the bar and from which are drawn horizontal wires A, B, C, and D of the barbed wire barried to be laid by the machine. Tubes 34 longitudinally extend substantially the length of the cart, being fed at the front by four corresponding, rotatably supported barbed wire supply reels 36. The tubes diverge at the rear of the cart to emit the barbed wire in the desired transverse configuration. Each reel 36 may be provided with a conventional friction clutch, not shown, to apply a predetermined tension on the wire being payed out.

Concentrically arranged about the fixed assembly of bar 32 and tubes 34 and rotatably supported thereabout by a bearing 38 is a hub 40 having an integral wrapping arm 42, the hub being driven by sprocket chain 24. Arm 42 is canted and has a free end extending radially beyond the diverged ends of tubes 32 and rotatably supports a fifth barbed wire spool 44 from which the wire E is payed through a short tube 34E fixed on the arm. As illustrated, spool 44 carries a limited amount of wire and an additional source may be provided to preclude the necessity for too frequent replenishment. Tube 42 extends transversely the longitudinal axes of tube 32, and as wrapping arm 42 is rotated thereabout wire E encircles the four spaced horizontal wires A—D as they are payed out of their respective tubes 32. Wire E is tied to each horizontal wire where they cross by a stapling mechanism 48 presently to be described.

Stapling mechanism 48 comprises four stapling arms 50A to 50D, each arm having one end pivotably mounted at 52 to stand 28. The opposite free end of each stapling arm is displaced radially in a diagonal plane containing a respective feed tube against the tension of stapling spring 53 by a cam 54 integrally mounted on hub 40. This arm displacement is achieved through the coaction of four cam followers 56A to 56D, each follower having a push rod 57 reciprocably supported by an inclined guide bracket 58 for translating the force in the respective diagonal planes containing the feed tubes. The ends of push rods 57 opposite the rollers are pinned at 59 to ride in a longitudinal slot 60 formed at an intermediate position in each stapling arm. Cam 54 rotates in the direction indicated by the arrow and is provided with a high point 61 which successively lifts each wrapping arm sufficiently above the discharge ends of feed tubes 34 to provide clearance for the passage of wrapping arm 42 and supply reel 44 (see Figs. 3 and 4). Cam 54 is also provided with a low point 63 immediately following high point 61 to provide a time lag such that as soon as wrapping arm and wire E crosses a horizontal strand (i.e., wire B in Fig. 3), the stapling arm is released by the cam and propelled inwardly under spring pressure to staple together the wires immediately crossed to ensure a rigid structure.

Figure 6:
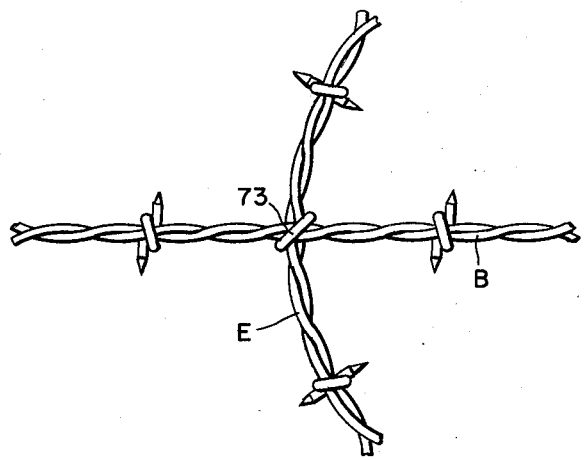
Fig. 6 is a portion of the obstacle pattern showing the stapled connection.

The stapling operation is achieved by providing an anvil 62 fixed to each feed tube 34 adjacent the exit opening, each anvil being supported by a spoke 64 mounted to bar 32. The outer face of each anvil has crossing guide channels 66E and 66B for receiving wires E and B, respectively, with a groove 67 to receive a staple 73 for tying the strands together, as shown in Fig. 6. The staples are furnished by a stapler 68 mounted to the free end of each stapling arm. The stapling arm is also provided with a pair of forked tongues 70 and 72 disposed at right angles to each other, tongue 70 guiding wire E into alignment with channel 66E as it is laid by the wrapping arm, and tongue 72 guiding wire B into alignment with channel 66B as it is payed out from tube 34B, enabling the wires to be firmly supported during the stapling operation.

The cart operates in the following manner. Assume the cart to be at rest and adequately supplied with five wire reels, and the horizontal wire ends are anchored to a post, tree, rock, or any other suitable support. As the cart begins to move over the ground, horizontal wires A, B, C, and D are payed out of their respective feed tubes being guided by the respective anvil grooves 67. Simultaneously, wrapping arm 42 starts to rotate being driven by differential 20 through sprocket chain 24 to encircle the horizontal wires with a transverse wire E. As wrapping arm approaches each stapling arm, for example 50B (Figs. 3 and 4), cam follower 56B rides up on the high point 61 of cam 54 lifting stapling arm 50B out of the circular path of wrapping arm 42 and permitting wire E to be payed out of tube 34B and into anvil channel 66E in crossing relation to wire B.

As soon as tube 34E travels past the anvil, cam follower 56B reaches the low point 63 of the cam releasing stapling arm 50B which under tension of spring 48 ties the crossing point of the respective wires by staple 73. The same action occurs at each stapling arm station in succession for the remainder of the revolution, and the cycle then repeats itself. The resulting pattern obtained with the illustrated invention consists of four horizontal wires rectangularly spaced encircled by a spiral loop of a fifth wire.

It is understood that the number and disposition of feed tubes can be varied depending on the configuration of the pattern desired. The drive between sprocket chain 24 and the cart wheels can be adjusted to give any desired pitch to the spiral wire E. A suitable setting would provide one revolution of the wrapping arm for four inches of forward travel of the cart. The novel cart is capable of laying a barbed wire pattern from 5 to 10 miles per hour, day or night, and under adverse conditions of warfare without the aid of manual labor other than replacing depleted reels.

Obviously many modifications and variations of the present invention are possible in the light of the above teachings. It is therefore to be understood that within the scope of the appended claims the invention may be practiced otherwise than as specifically described.

I claim:

1. A mobile barbed wire obstacle laying cart comprising a chassis, a plurality of vertically spaced-apart first wire dispensing means supported on the chassis for paying out a plurality of correspondingly spaced-apart horizontally extending wires as the cart travels along the ground adapted to be anchored to a support, said wires being stiff and freely suspended between said dispensing means and the support, a second wire dispensing means supported on the chassis for paying out a wire transverse to said horizontal wires, said first and second wire dispensing means each being provided with a wire supply, said second wire dispensing means being revolvable about said first wire dispensing means concurrently with cart movements to wrap said transverse wire around said horizontal wires, means for rotating said second wire dispensing means, and means for securing said transverse wire to the horizontal wires at their crossing portions forming a hollow freely standing barbed wire pattern.

2. A mobile barbed wire obstacle laying cart comprising a chassis, a plurality of vertically spaced-apart first wire dispensing means supported on the chassis for paying out a plurality of correspondingly spaced-apart horizontally extending wires as the cart travels along the ground adapted to be anchored to a support, said wires being stiff and freely suspended between said dispensing means and the support, a second wire dispensing means on the chassis for paying out a wire transverse to said horizontal wires, said first and second wire dispensing means each being provided with a wire supply, said second wire dispensing means being mounted on a revolvable arm for wrapping said transverse wire around said horizontal wires, means for rotating said arm during cart movement, and means located at each of the first wire dispensing means for securing together the crossing portions of the transverse and horizontal wires forming a hollow freely standing barbed wire pattern.

3. The cart of claim 2 wherein said revolving arm is driven by rotation of the chassis wheels.

4. A mobile wire obstacle laying cart comprising a chassis, a plurality of vertically spaced apart first wire dispensing means supported in the chassis for paying out a plurality of correspondingly spaced-apart horizontally extending wires adapted to be anchored to a support, said wires being stiff and freely suspended between said dispensing means and the support, a second wire dispensing means on said chassis for paying out a wire transverse to said horizontal wires, said first and second wire dispensing means being provided with a wire supply, said second means being mounted on a revolving arm for externally encircling said transverse wire about said horizontal wires, means for rotating said arm, an anvil fixed to each first wire dispensing means, a spring biased wire stapler movably supported adjacent to and outwardly of each first wire dispensing means, and means for lifting each stapler in succession to permit passage of said revolving arm and subsequent stapling together of the crossing portions of said wires forming a hollow freely standing barbed wire pattern.

5. The cart of claim 4 wherein said last mentioned means comprises a cam having a high point for lifting said wire stapler out of the path of said wrapping arm and having a low point for releasing said spring biased wire stapler to staple the crossing points of said wires.

6. A mobile wire obstacle laying cart comprising a chassis, a plurality of horizontal feed tubes mounted on said chassis and having exit openings vertically spaced-apart for paying out a plurality of corresponding spaced-apart horizontally extending wires adapted to be anchored to a support, a wire supply reel for each of said feed tubes, a revolving arm rotatably supported on said chassis and carrying a transversely dispensed feed means and a supply reel of wire, drive means connected to the chassis wheels for rotating said arm, a stand mounted on the chassis, a pivotable lever for each of said horizontal feed tubes, each lever hinged to said stand, each pivotable lever supporting a wire stapler including an anvil mounted to each of said tubes adjacent each of the tube exists, a cam rotatable with the revolving arm for successively lifting and releasing said levers to permit passage of said revolving arm, and the subsequent stapling together the crossing portions of said wires.

7. The cart of claim 6 wherein means are provided to guide said wires into a stapling position.

References Cited in the file of this patent

UNITED STATES PATENTS

| 740,444 | Lamb | Oct. 6, 1903 |
|---|---|---|
| 1,198,351 | Heany | Sept. 12, 1916 |
| 1,259,151 | Sommer | Mar. 12, 1918 |
| 2,349,750 | Peterson | May 23, 1944 |
| 2,422,827 | Drieschman | June 24, 1947 |